UNITED STATES PATENT OFFICE.

ANSON GARDNER BETTS, OF TROY, NEW YORK.

PROCESS OF SMELTING ZINC ORES.

No. 918,648.  Specification of Letters Patent.  Patented April 20, 1909.

Application filed September 26, 1908. Serial No. 454,911.

*To all whom it may concern:*

Be it known that I, ANSON GARDNER BETTS, a citizen of the United States, residing at Troy, in the county of Rensselaer and State of New York, have invented certain new and useful Improvements in Processes of Smelting Zinc Ores, of which the following is a specification.

This invention relates to the extraction of zinc from ores or ore-products.

One of the objects of my invention is to provide a method whereby zinc ores containing impurities, such as iron or lead, which yield liquid products and cause difficulties in the usual processes, may be satisfactorily treated.

Other objects will appear in connection with the following description of my method.

The reduction of zinc oxid by carbon requires a high temperature of working and a large supply of heat at this temperature, and the efficiency of heat supply at such temperatures is very low in zinc furnaces.

My process makes use of the reduction of zinc oxid by other reducing agents than carbon, which produce heat in considerable quantity during the reduction of zinc oxid. Such reducing agents are especially silicon and alloys thereof and silicids, also aluminum, calcium, magnesium, etc., or alloys or carbids thereof. In case of a continuous smelting operation, the amount of heat produced by the reduction of zinc oxid in ores or ore products by such reducing agents is great enough to keep the temperature of the furnace wherein the smelting takes place, several hundred degrees higher than that at which the ore and reducing agent is added. The heat of reaction is not however sufficient to also raise the furnace charge to the smelting temperature.

As carried out in the preferred manner, with silicon as the principal reducing agent, the process is as follows: The ore before or after roasting is mixed with silicon or a silicon alloy, as high-silicon ferrosilicon, in quantity sufficient to reduce the contained oxids of zinc, copper, lead and iron, and the mixture heated in a reverberatory furnace but not to the temperature at which the reduction of zinc takes place. This heating can be safely done in the air or in furnace gases without serious oxidation of the silicon. The heated mixture is passed at high temperature into a highly heated furnace chamber, wherein the charge heats up further and the reaction commences and goes on. The heat of reaction is large and thereafter the amount of heat required to maintain the smelting temperature in a furnace chamber to which the ore and silicon mixture is added continuously or at intervals, while slag etc., are tapped off, is largely reduced or entirely done away with. The distilled zinc may be readily condensed with a suitable condenser.

In distinction from the usual process, the presence of elements in the ore which yield liquid smelting-products is not disadvantageous, as any liquid products may be tapped from the furnace.

The unoxidizability of the reducing agent used, except at very high temperatures, in distinction from the carbon hitherto used, allows of the ready and economical preheating of the charge by ordinary furnace methods, for example, preheating in a reverberatory roasting furnace, and even simultaneously roasting the ore.

To assist in the formation of thinly-fluid slags, I may add to the charge fluxes as lime, magnesia, limestone, or even calcium carbid, which latter reacts as reducing agent and flux-former both.

The term "oxidized" as used in the claims means already naturally oxidized, or in case of a sulfid ore, artificially oxidized. The term "silicon" as used in the claims, except claim 2, includes silicon alloys and silicids.

What I claim as new and desire to secure by Letters Patent, is—

1. The process of treating zinc ore which consists in heating it to a temperature below the temperature of reduction by silicon, and passing a mixture thereof with silicon into a furnace wherein it is further sufficiently heated to cause the reduction of zinc by silicon to take place.

2. The process of treating zinc ore which consists in mixing the ore with a reducing agent unoxidizable by air below a temperature of 800° C., heating the mixed ore and reducing agent while exposed to the furnace gases by the agency of combustion, and reducing the ore by the action of said reducing agent at a higher temperature, and away from the said gases.

3. The process of treating zinc ore which consists in mixing the ore with a reducing agent unoxidizable by air below a temperature of 800° C., heating the mixed ore and reducing agent by the heat of a combustion process and reducing the ore by the action of said reducing agent at a higher temperature.

4. The process of treating zinc ore which consists in heating the ore by oxidation thereof, and reducing it at a higher temperature by a material containing unoxidized silicon.

5. The process of treating zinc ore which consists in heating it to a temperature below the temperature of reduction and reducing it at a higher temperature by a material containing unoxidized silicon.

In testimony whereof I have hereunto signed my name in the presence of two subscribing witnesses.

ANSON GARDNER BETTS.

Witnesses:
   FREDERICK CLARK,
   BENJAMIN STARBUCK.